US008683003B2

(12) United States Patent
Arav

(10) Patent No.: US 8,683,003 B2
(45) Date of Patent: *Mar. 25, 2014

(54) HYPERLINK WITH GRAPHICAL CUE

(75) Inventor: Gal Arav, Bedford, MA (US)

(73) Assignee: Boadin Technology, LLC, Newark, DE (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/334,093

(22) Filed: Dec. 12, 2008

(65) Prior Publication Data

US 2009/0199135 A1    Aug. 6, 2009

Related U.S. Application Data

(63) Continuation of application No. 11/384,957, filed on Mar. 20, 2006, now Pat. No. 7,529,795.

(60) Provisional application No. 60/784,141, filed on Mar. 20, 2006.

(51) Int. Cl.
  *G06F 15/16*    (2006.01)
(52) U.S. Cl.
  USPC .......................................... 709/217; 709/228
(58) Field of Classification Search
  USPC .................................................. 709/204, 217
  See application file for complete search history.

(56) References Cited

U.S. PATENT DOCUMENTS

| 5,754,176 | A | 5/1998 | Crawford | 345/338 |
|---|---|---|---|---|
| 5,854,630 | A | 12/1998 | Nielsen | 345/352 |
| 6,065,051 | A | 5/2000 | Steele et al. | 709/219 |
| 6,199,077 | B1 | 3/2001 | Inala et al. | 707/501 |
| 6,199,157 | B1 | 3/2001 | Dov et al. | 713/1 |
| 6,208,339 | B1 | 3/2001 | Atlas et al. | 715/780 |
| 6,216,141 | B1 | 4/2001 | Straub et al. | 707/513 |
| 6,253,325 | B1 | 6/2001 | Steele et al. | 713/201 |
| 6,282,548 | B1 | 8/2001 | Burner et al. | 707/104 |
| 6,314,458 | B1 | 11/2001 | Steele et al. | 709/219 |
| 6,336,133 | B1 | 1/2002 | Morris et al. | 709/204 |
| 6,366,947 | B1 * | 4/2002 | Kavner | 709/203 |

(Continued)

FOREIGN PATENT DOCUMENTS

| WO | WO 02/03243 A1 | 1/2002 |
|---|---|---|
| WO | WO 02/061610 A1 | 8/2002 |
| WO | WO 2004/029780 A2 | 4/2004 |
| WO | WO 2007/109264 A3 | 9/2007 |

OTHER PUBLICATIONS 2.barchart.com/lookup.asp (Mar. 15, 2010).
abcnews.go.com/business (Mar. 15, 2010).

(Continued)

*Primary Examiner* — Gerald Smarth
(74) *Attorney, Agent, or Firm* — Patrick E. Caldwell, Esq.; The Caldwell Firm, LLC

(57) ABSTRACT

A computer program provides a first set of representations (e.g., textual representations) of a first set of hyperlinks. In response to selection by a user of one of the first set of hyperlink representations (such as by clicking on or hovering a cursor over the representation), the program displays a second set of representations (e.g., graphical representations) of a second set of hyperlinks. The user may select one of the second set of representations, in response to which the program navigates to the destination of the hyperlink. The second set of representations may, for example, be logos of companies, and the second set of hyperlinks may be hyperlinks to the companies' web sites.

20 Claims, 2 Drawing Sheets

(56) References Cited

U.S. PATENT DOCUMENTS

| | | | |
|---|---|---|---|
| 6,393,468 B1 | 5/2002 | McGee | 709/218 |
| 6,405,238 B1 | 6/2002 | Votipka | 709/203 |
| 6,421,651 B1 | 7/2002 | Tedesco et al. | 705/8 |
| 6,430,537 B1 | 8/2002 | Tedesco et al. | 705/8 |
| 6,456,303 B1 | 9/2002 | Walden et al. | 345/705 |
| 6,484,149 B1 | 11/2002 | Jammes et al. | 705/26 |
| 6,498,835 B1 | 12/2002 | Skladman et al. | 379/88.12 |
| 6,515,681 B1 | 2/2003 | Knight | 345/751 |
| 6,633,311 B1 | 10/2003 | Douvikas et al. | 345/731 |
| 6,661,877 B1 | 12/2003 | Lee et al. | 379/67.1 |
| 6,691,158 B1 | 2/2004 | Douvikas et al. | 709/219 |
| 6,748,449 B1 | 6/2004 | Dutta | 709/245 |
| 6,874,126 B1 | 3/2005 | Lapidous | 715/711 |
| 6,879,691 B1 | 4/2005 | Koretz | 380/255 |
| 6,889,213 B1 | 5/2005 | Douvikas et al. | 705/67 |
| 6,952,730 B1 | 10/2005 | Najork et al. | 709/225 |
| 7,017,109 B1 | 3/2006 | Douvikas et al. | 715/501.1 |
| 7,024,451 B2 | 4/2006 | Jorgenson | 709/203 |
| 7,069,308 B2 | 6/2006 | Abrams | 709/218 |
| 7,117,254 B2 | 10/2006 | Lunt et al. | 709/218 |
| 7,188,080 B1 | 3/2007 | Walker et al. | 705/26 |
| 7,188,153 B2 | 3/2007 | Lunt et al. | 709/218 |
| 7,194,552 B1 | 3/2007 | Schneider | 709/245 |
| 7,231,428 B2 | 6/2007 | Teague | 709/206 |
| 7,233,997 B1 | 6/2007 | Leveridge et al. | 709/229 |
| 7,340,419 B2 | 3/2008 | Walker et al. | 705/27 |
| 7,373,338 B2 | 5/2008 | Thompson et al. | 707/3 |
| 7,451,161 B2 | 11/2008 | Zhu et al. | 707/104.1 |
| 7,478,078 B2 | 1/2009 | Lunt et al. | 707/1 |
| 7,487,441 B2 | 2/2009 | Szeto | 715/234 |
| 7,499,940 B1 | 3/2009 | Gibbs | 707/102 |
| 7,526,440 B2 | 4/2009 | Walker et al. | 705/26 |
| 7,590,687 B2 * | 9/2009 | Bales et al. | 709/203 |
| 7,606,687 B2 | 10/2009 | Galbreath et al. | 703/3 |
| 7,606,865 B2 | 10/2009 | Kumar et al. | 709/206 |
| 7,669,123 B2 | 2/2010 | Zuckerberg et al. | 715/273 |
| 7,680,882 B2 | 3/2010 | Tiu et al. | 709/203 |
| 7,685,036 B1 | 3/2010 | Hsu et al. | 705/35 |
| 7,725,492 B2 | 5/2010 | Sittig et al. | 707/784 |
| 7,752,251 B1 | 7/2010 | Shuster et al. | 709/200 |
| 7,765,568 B1 | 7/2010 | Gagnon et al. | 725/38 |
| 7,788,260 B2 | 8/2010 | Lunt et al. | 707/727 |
| 7,797,256 B2 | 9/2010 | Zuckerberg et al. | 705/319 |
| 7,809,805 B2 | 10/2010 | Stremel et al. | 709/219 |
| 7,827,208 B2 | 11/2010 | Bosworth et al. | 707/802 |
| 7,827,265 B2 | 11/2010 | Cheever et al. | 709/223 |
| 7,835,950 B2 | 11/2010 | Walker et al. | 705/27 |
| 7,890,501 B2 | 2/2011 | Lunt et al. | 707/722 |
| 7,895,644 B1 * | 2/2011 | Thakur et al. | 726/5 |
| 7,912,758 B2 | 3/2011 | Walker et al. | 705/26 |
| 7,913,185 B1 * | 3/2011 | Benson et al. | 715/808 |
| 7,933,810 B2 | 4/2011 | Morgenstern | 705/26.1 |
| 7,945,653 B2 | 5/2011 | Zuckerberg et al. | 709/223 |
| 7,970,657 B2 | 6/2011 | Morgenstern | 705/26.1 |
| 8,005,919 B2 | 8/2011 | Mehanna et al. | 709/217 |
| 8,010,458 B2 | 8/2011 | Galbreath et al. | 15/320 |
| 2001/0018698 A1 | 8/2001 | Uchino et al. | 707/533 |
| 2002/0065671 A1 | 5/2002 | Goerz, Jr. et al. | 705/1 |
| 2002/0130895 A1 | 9/2002 | Brandt et al. | 345/708 |
| 2002/0152238 A1 | 10/2002 | Hayes | 707/513 |
| 2003/0041147 A1 | 2/2003 | van den Oord et al. | 709/227 |
| 2003/0061114 A1 | 3/2003 | Schwartz et al. | 705/26 |
| 2003/0115306 A1 | 6/2003 | Hagarty et al. | 709/223 |
| 2003/0188263 A1 * | 10/2003 | Bates et al. | 715/513 |
| 2003/0196172 A1 * | 10/2003 | Bates et al. | 715/513 |
| 2004/0098269 A1 | 5/2004 | Wise et al. | 705/1 |
| 2004/0143841 A1 * | 7/2004 | Wang et al. | 725/32 |
| 2004/0172405 A1 | 9/2004 | Farran | 707/100 |
| 2004/0225708 A1 * | 11/2004 | Christodoulou et al. | 709/200 |
| 2004/0254881 A1 | 12/2004 | Kumar et al. | 705/40 |
| 2005/0049939 A1 | 3/2005 | Lai et al. | 705/27 |
| 2005/0076110 A1 | 4/2005 | Mathew et al. | 709/223 |
| 2005/0144573 A1 | 6/2005 | Moody et al. | 715/825 |
| 2005/0165793 A1 | 7/2005 | Mosterman | 707/100 |
| 2005/0198128 A1 | 9/2005 | Anderson et al. | 709/204 |
| 2005/0267940 A1 | 12/2005 | Galbreath et al. | 709/206 |
| 2005/0278443 A1 | 12/2005 | Winner et al. | 709/224 |
| 2006/0015821 A1 | 1/2006 | Parker et al. | 715/800 |
| 2006/0021009 A1 | 1/2006 | Lunt | 726/4 |
| 2006/0031404 A1 | 2/2006 | Kassab | 709/218 |
| 2006/0064342 A1 | 3/2006 | Frengut et al. | 705/10 |
| 2006/0155809 A1 | 7/2006 | Arav | 709/204 |
| 2006/0168233 A1 | 7/2006 | Alcorn et al. | 709/226 |
| 2006/0174340 A1 | 8/2006 | Santos et al. | 726/21 |
| 2006/0206454 A1 | 9/2006 | Forstall et al. | 707/3 |
| 2006/0239546 A1 | 10/2006 | Tedesco et al. | 382/159 |
| 2006/0248160 A1 | 11/2006 | Plummer | 709/217 |
| 2007/0022021 A1 | 1/2007 | Walker et al. | 705/26 |
| 2007/0028185 A1 * | 2/2007 | Bhogal et al. | 715/808 |
| 2007/0100779 A1 | 5/2007 | Levy et al. | 705/500 |
| 2007/0112835 A1 * | 5/2007 | McMullen et al. | 707/102 |
| 2007/0113201 A1 * | 5/2007 | Bales et al. | 715/810 |
| 2007/0143704 A1 | 6/2007 | Laird-McConnell | 715/781 |
| 2007/0192181 A1 * | 8/2007 | Asdourian | 705/14 |
| 2007/0192299 A1 | 8/2007 | Zuckerberg et al. | 707/3 |
| 2008/0040474 A1 | 2/2008 | Zuckerberg et al. | 709/224 |
| 2008/0040475 A1 | 2/2008 | Bosworth et al. | 709/224 |
| 2008/0046976 A1 | 2/2008 | Zuckerberg | 726/4 |
| 2008/0052372 A1 * | 2/2008 | Weber et al. | 709/217 |
| 2008/0059607 A1 | 3/2008 | Schneider | 709/218 |
| 2008/0065604 A1 | 3/2008 | Tiu et al. | 707/3 |
| 2008/0065701 A1 | 3/2008 | Lindstrom et al. | 707/201 |
| 2008/0103889 A1 * | 5/2008 | Solotko | 705/14 |
| 2008/0189292 A1 | 8/2008 | Stremel et al. | 707/10 |
| 2008/0189380 A1 | 8/2008 | Bosworth et al. | 709/207 |
| 2008/0189395 A1 | 8/2008 | Stremel et al. | 709/219 |
| 2008/0189768 A1 | 8/2008 | Callahan et al. | 726/4 |
| 2008/0281816 A1 | 11/2008 | Kim | 707/6 |
| 2008/0313714 A1 | 12/2008 | Fetterman et al. | 726/4 |
| 2009/0013413 A1 | 1/2009 | Vera et al. | 726/30 |
| 2009/0024548 A1 | 1/2009 | Zhu et al. | 706/21 |
| 2009/0031301 A1 | 1/2009 | D'Angelo et al. | 717/178 |
| 2009/0037277 A1 | 2/2009 | Zuckerberg et al. | 705/14 |
| 2009/0048922 A1 | 2/2009 | Morgenstern et al. | 705/14 |
| 2009/0049014 A1 | 2/2009 | Steinberg | 707/3 |
| 2009/0049036 A1 | 2/2009 | Juan et al. | 707/5 |
| 2009/0049070 A1 | 2/2009 | Steinberg | 707/101 |
| 2009/0049127 A1 | 2/2009 | Juan et al. | 709/204 |
| 2009/0049525 A1 | 2/2009 | D'Angelo et al. | 726/4 |
| 2009/0070219 A1 | 3/2009 | D'Angelo et al. | 705/14 |
| 2009/0070334 A1 | 3/2009 | Callahan et al. | 707/9 |
| 2009/0070412 A1 | 3/2009 | D'Angelo et al. | 709/203 |
| 2009/0119167 A1 | 5/2009 | Kendall et al. | 705/14 |
| 2009/0144392 A1 | 6/2009 | Wang et al. | 709/217 |
| 2009/0158143 A1 | 6/2009 | Arav | 715/261 |
| 2009/0158169 A1 | 6/2009 | Arav | 715/751 |
| 2009/0182589 A1 | 7/2009 | Kendall et al. | 705/5 |
| 2009/0193333 A1 | 7/2009 | Arav | 715/261 |
| 2009/0193349 A1 | 7/2009 | Arav | 715/764 |
| 2009/0198487 A1 | 8/2009 | Wong et al. | 704/4 |
| 2009/0199135 A1 | 8/2009 | Arav | 715/841 |
| 2009/0228342 A1 | 9/2009 | Walker et al. | 705/10 |
| 2009/0228780 A1 | 9/2009 | McGeehan | 715/234 |
| 2009/0287786 A1 | 11/2009 | Arav | 709/206 |
| 2010/0049534 A1 | 2/2010 | Whitnah et al. | 705/1 |
| 2010/0049852 A1 | 2/2010 | Whitnah et al. | 709/226 |
| 2010/0094878 A1 * | 4/2010 | Soroca et al. | 707/748 |
| 2010/0132049 A1 | 5/2010 | Vernal et al. | 726/27 |
| 2010/0162375 A1 | 6/2010 | Tiu, Jr. et al. | 726/7 |
| 2010/0164957 A1 | 7/2010 | Lindsay et al. | 345/440 |
| 2010/0169327 A1 | 7/2010 | Lindsay et al. | 707/750 |
| 2010/0180032 A1 | 7/2010 | Lunt | 709/225 |
| 2010/0185580 A1 | 7/2010 | Zhu et al. | 706/52 |
| 2010/0198581 A1 | 8/2010 | Ellis | 704/4 |
| 2010/0211996 A1 | 8/2010 | McGeehan et al. | 726/4 |
| 2010/0211997 A1 | 8/2010 | McGeehan et al. | 726/4 |
| 2010/0217645 A1 | 8/2010 | Jin et al. | 705/9 |
| 2010/0229223 A1 | 9/2010 | Shepard et al. | 726/5 |
| 2010/0257023 A1 | 10/2010 | Kendall et al. | 705/10 |
| 2010/0257459 A1 | 10/2010 | Galbreath et al. | 715/753 |
| 2010/0287368 A1 | 11/2010 | Shuster et al. | 713/150 |
| 2010/0306043 A1 | 12/2010 | Lindsay et al. | 705/14.41 |
| 2010/0318571 A1 | 12/2010 | Pearlman et al. | 707/784 |
| 2011/0004692 A1 | 1/2011 | Occhino et al. | 709/228 |

(56) References Cited

U.S. PATENT DOCUMENTS

| | | | |
|---|---|---|---|
| 2011/0004831 A1 | 1/2011 | Steinberg et al. | 715/753 |
| 2011/0016169 A1 | 1/2011 | Cahill et al. | 709/203 |
| 2011/0016381 A1 | 1/2011 | Cahill et al. | 715/234 |
| 2011/0016382 A1 | 1/2011 | Cahill et al. | 715/234 |
| 2011/0018342 A1 | 1/2011 | Park et al. | 307/23 |
| 2011/0022657 A1 | 1/2011 | Zhu et al. | 709/204 |
| 2011/0023101 A1 | 1/2011 | Vernal et al. | 726/7 |
| 2011/0023129 A1 | 1/2011 | Vernal et al. | 726/28 |
| 2011/0044354 A1 | 2/2011 | Wei | 370/468 |
| 2011/0055314 A1 | 3/2011 | Rosenstein et al. | 709/203 |
| 2011/0055332 A1 | 3/2011 | Stein | 709/206 |
| 2011/0055683 A1 | 3/2011 | Jiang | 715/234 |
| 2011/0083101 A1 | 4/2011 | Sharon et al. | 715/800 |
| 2011/0087526 A1 | 4/2011 | Morgenstern et al. | 705/14.1 |
| 2011/0106630 A1 | 5/2011 | Hegeman et al. | 705/14.71 |
| 2011/0125599 A1 | 5/2011 | Morin et al. | 705/26.1 |
| 2011/0128699 A1 | 6/2011 | Heydari et al. | 361/679.48 |
| 2011/0137902 A1 | 6/2011 | Wable et al. | 707/737 |
| 2011/0137932 A1 | 6/2011 | Wable | 707/769 |
| 2011/0145287 A1 | 6/2011 | Jiang et al. | 707/780 |
| 2011/0145321 A1 | 6/2011 | Jiang | 709/203 |
| 2011/0153377 A1 | 6/2011 | Novikov et al. | 705/71.1 |
| 2011/0153412 A1 | 6/2011 | Novikov et al. | 705/14.42 |
| 2011/0153416 A1 | 6/2011 | Walker et al. | 705/14.49 |
| 2011/0153421 A1 | 6/2011 | Novikov et al. | 705/14.52 |
| 2011/0154223 A1 | 6/2011 | Whitnah et al. | 715/753 |
| 2011/0154842 A1 | 6/2011 | Heydari et al. | 62/259.2 |
| 2011/0156480 A1 | 6/2011 | Park | 307/23 |
| 2011/0161602 A1 | 6/2011 | Adams et al. | 711/148 |
| 2011/0161980 A1 | 6/2011 | English et al. | 718/105 |
| 2011/0161987 A1 | 6/2011 | Huang et al. | 719/318 |
| 2011/0179347 A1 | 7/2011 | Proctor et al. | 715/234 |
| 2011/0196855 A1 | 8/2011 | Wable et al. | 707/711 |
| 2012/0066340 A1 | 3/2012 | Armstrong et al. | 709/217 |

OTHER PUBLICATIONS activetradermag.com/ (Mar. 15, 2010).
ADVFN.com as viewed on Mar. 21, 2007.
advfn.com/ (Mar. 15, 2010).
AllStocks.com as viewed on Mar. 21, 2007.
ant.com/tags/finance/?page=1 (Mar. 15, 2010).
asx.com.au/ (Mar. 15, 2010).
bigcharts.marketwatch.com/ (Mar. 15, 2010).
bloomberg.com/apps/tkrlookup (Mar. 15, 2010).
BoardCentral Website (Feb. 15, 2006).
boardcentral.com/ (Mar. 15, 2010).
boston.com/ (Mar. 15, 2010).
briefing.com/ (Mar. 15, 2010).
Bullpoo.com as viewed on Mar. 21, 2007.
businessweek.com/ (Mar. 15, 2010).
cboe.com/DelayedQuote/Symbol.aspx (Mar. 15, 2010).
ClearStation Website (Feb. 15, 2006).
clearstation.etrade.com/cgi-bin/symbol_search (Mar. 15, 2010).
CollectiveIntellect.com as viewed on Mar. 21, 2007.
earningswhispers.com/tickerlookup.asp (Mar. 15, 2010).
economist.com/index.html (Mar. 15, 2010).
edgar-online.com/ (Mar. 15, 2010).
EliteTrader.com as viewed on Mar. 21, 2007.
EquityGroups.com as viewed on Mar. 21, 2007.
esignal.com/support/default.aspx (Mar. 15, 2010).
euronext.com/landing/indexMarket-18812-EN.html (Mar. 15, 2010).
FeedTheBull.com as viewed on Mar. 21, 2007.
Finance.Google.com as viewed on Mar. 21, 2007.
finance.yahoo.com (Mar. 15, 2010).
fool.com/ (Mar. 15, 2010).
Forbes.com (Mar. 15, 2010).
Forex Trading Website (Feb. 17, 2006).
foxbusiness.com/index.html (Mar. 15, 2010).
freeedgar.com/ (Mar. 15, 2010).
FreeRealTime Message Boards Website (Feb. 15, 2006).
ft.com/home/uk (Mar. 15, 2010).
globeinvestor.com/static/hubs/lookup.html (Mar. 15, 2010).
Google.com (Mar. 15, 2010).
hoovers.com (Mar. 15, 2010).
inc.com/ (Mar. 15, 2010).
individual.troweprice.com/public/Retail/Products-&-Services/Brokerage (Mar. 15, 2010).
investing.quicken.com/public/symbolLookup.asp (Mar. 15, 2010).
investools.com/ (Mar. 15, 2010).
investors.com/symbol.asp (Mar. 15, 2010).
investorshub.advfn.com/ (Mar. 15, 2010).
InvestorsHub.com as viewed on Mar. 21, 2007.
InvestorVillage Website (Feb. 17, 2006).
investorvillage.com/home.asp (Mar. 15, 2010).
kiplinger.com/ (Mar. 15, 2010).
londonstockexchange.com/home/homepage.htm (Mar. 15, 2010).
MarketWatch Message Boards Website (Feb. 15, 2006).
Marketwatch.com (Mar. 15, 2010).
mldirect.ml.com/ (Mar. 15, 2010).
money.cnn.com/magazines/fortune/ (Mar. 15, 2010).
money.cnn.com/quote/lookup/index.html (Mar. 15, 2010).
Moneycentral.msn.com/investor/common/find.asp?NextPage=/detail/stock_quote (Mar. 15, 2010).
Monitor110.com as viewed on Mar. 21, 2007.
MSN Money Message Boards Website (Feb. 15, 2006).
nasdaq.com/ (Mar. 15, 2010).
news.bbc.co.uk/ (Mar. 15, 2010).
nyse.com/ (Mar. 15, 2010).
nyse.com/attachment/amex_landing.htm (Mar. 15, 2010).
nytimes.com/ (Mar. 15, 2010).
online.barrons.com/home-page (Mar. 15, 2010).
online.wsj.com/home-page (Mar. 15, 2010).
pennystock.com/ (Mar. 15, 2010).
personal.fidelity.com/research/stocks/content/stocksindex.shtml?bar=c (Mar. 15, 2010).
quote.com/help/resources/toolbox.jsp (Mar. 15, 2010).
quote.com/search.action (Mar. 15, 2010).
quote.com/std/search.action (Mar. 15, 2010).
quote.morningstar.com/tickerlookup.html (Mar. 15, 2010).
RagingBull Website (Feb. 15, 2006).
ragingbull.quote.com/cgi-bin/static.cgi/a=index.txt&d=mainpages (Mar. 15, 2010).
renaissancecapital.com/RenCap/Default.aspx (Mar. 15, 2010).
schwab.com/public/schwab/home/welcomep.html (Mar. 15, 2010).
scottrade.com/ (Mar. 15, 2010).
sec.gov/edgar.shtml (Mar. 15, 2010).
seekingalpha.com/ (Mar. 15, 2010).
sharebuilder.com/ (Mar. 15, 2010).
Silicon Investor Message Boards Website (Feb. 15, 2006).
siliconinvestor.advfn.com/ (Mar. 15, 2010).
SmallCapCenter.com Message Boards Website (Feb. 15, 2006).
SocialPicks.com as viewed on Mar. 21, 2007.
stockcharts.com/index.html (Mar. 15, 2010).
StockHouse Bullboards Website (Feb. 15, 2006).
stockhouse.com/ (Mar. 15, 2010).
StockPickr.com as viewed on Mar. 21, 2007.
StockSelector.com Message Boards Website (Feb. 15, 2006).
StockTickr.com as viewed on Mar. 21, 2007.
tdameritrade.com/welcome4.html (Mar. 15, 2010).
The Motley Fool Discussion Boards Website (Feb. 15, 2006).
thedeal.com/ (Mar. 15, 2010).
TheLion.com as viewed on Mar. 21, 2007.
thelion.com/ (Mar. 15, 2010).
thestreet.com/quote/%5EDJI.html?pg-qcn& (Mar. 15, 2010).
tickertech.com/cgi/?a=lookup (Mar. 15, 2010).
tmx.com/ (Mar. 15, 2010).
traders.com/ (Mar. 15, 2010).
us.etrade.com/e/t/home (Mar. 15, 2010).
usatoday.com/money/2007-05-15-search-tips_N.htm (Mar. 15, 2010).
vanguard.com/ (Mar. 15, 2010).
wallstreetselect.com/ (Mar. 15, 2010).
WallStreetTape.com Website (Feb. 15, 2006).

(56) References Cited

OTHER PUBLICATIONS

Wallstrip.com as viewed on Mar. 21, 2007.
washingtonpost.com/ (Mar. 15, 2010).
whispernumber.com/index.jsp (Mar. 15, 2010).
Yahoo! Message Boards Website (Feb. 15, 2006).
zacks.com/ (Mar. 15, 2010).
Nicholas C. Zakas, *Professional JavaScript for Web Development*, Wrox (2005), pp. 362-364.
Michael Glass, *Beginning PHP, Apache, MySQL Web Development*, Wiley Publishing (2004), p. 361.
James Keogh, *JavaScript Demystified*, McGraw-Hill Osborne Media (2005), pp. 294-305.
Notice of Allowance from U.S. Appl. No. 11/384,957 which was mailed on Feb. 25, 2009.
Notice of Allowance from U.S. Appl. No. 12/334,024 which was mailed on Mar. 22, 2011.
Notice of Allowance from U.S. Appl. No. 12/334,037 which was mailed on Oct. 1, 2010.
Notice of Allowance from U.S. Appl. No. 12/334,063 which was mailed on Sep. 20, 2010.
Office Action from U.S. Appl. No. 11/384,957 which was mailed on May 13, 2008.
Office Action from U.S. Appl. No. 12/334,024 which was mailed on Aug. 5, 2010.
Office Action from U.S. Appl. No. 12/334,037 which was mailed on Mar. 9, 2010.
Office Action from U.S. Appl. No. 12/334,063 which was mailed on Mar. 9, 2010.
Office Action from U.S. Appl. No. 12/334,068 which was mailed on Jun. 10, 2011.
Office Action from U.S. Appl. No. 12/334,068 which was mailed on Aug. 4, 2010.
Office Action from U.S. Appl. No. 12/334,093 which was mailed on May 12, 2011.
Office Action from U.S. Appl. No. 12/334,093 which was mailed on Aug. 18, 2010.
google.com screenshot captured by web.archive.org (Dec. 15, 2004).
Bitflux Blog Wiki screenshot captured by web.archive.org (Feb. 6, 2005).
Jon Udell, *The Browser Reloaded*, InfoWorld.com (Feb. 21, 2005).
J. Keith, *DOM Scripting*, Keith (2005), p. 303.
F. Schneider, *How to Do Everything with Google*, McGraw-Hill (2004), p. 51-52.
c/net home page captured by web.archive.org (Mar. 1, 2005), Figs 1-4.
Office Action from U.S. Appl. No. 12/435,296 which was mailed on Feb. 3, 2011.
Office Action from U.S. Appl. No. 12/435,296 which was mailed on Aug. 20, 2010.
Office Action from U.S. Appl. No. 13/099,342 which was mailed on Sep. 6, 2011.
Chein, Andrew A., "Concurrent Aggregates: Using Multiple-Access Data Abstractions to Manage Complexity in Concurrent Programs," ACM, 1990, pp. 31-36.
Sharma, Niraj, "Adding 'Google Suggest' functionality to an ASP.NET application," Dec. 1, 2005.
Narra, Gavi, "Google Suggest like Dictionary," Dec. 27, 2004.
Notice of Allowance for U.S. Appl. No. 12/334,024 dated Dec. 29, 2011.
Notice of Allowance for U.S. Appl. No. 12/334,024 dated Jan. 27, 2012.
Notice of Allowance for U.S. Appl. No. 12/435,296 dated Mar. 22, 2011.
Notice of Allowance for U.S. Appl. No. 12/435,296 dated Dec. 29, 2011.
Notice of Allowance for U.S. Appl. No. 12/435,296 dated Jan. 27, 2012.
Notice of Allowance for U.S. Appl. No. 12/435,296 dated Feb. 27, 2012.
Ex. Interview Summary for U.S. Appl. No. 13/099,342 dated Mar. 2, 2012.
Office Action from U.S. Appl. No. 13/099,345 dated Dec. 22, 2011.
Notice of All. U.S. Appl. No. 13/099,342 May 25, 2012.
Notice of All. U.S. Appl. No. 13/099,345 Jun. 1, 2012.

\* cited by examiner

HYPERLINK WITH GRAPHICAL CUE

RELATED APPLICATIONS

The present application is a continuation of U.S. application Ser. No. 11/384,957 filed Mar. 20, 2006 now U.S. Pat. No. 7,529,795, which is incorporated herein by reference. The present application is also related to U.S. provisional application Ser. No. 60/784,141 filed Mar. 20, 2006, which is incorporated herein by reference.

BACKGROUND

1. Field of the Invention

The present invention relates to computer-implemented techniques for improving the usefulness of hyperlinks in web pages.

2. Related Art

Web pages, and other kinds of hypertext documents, use textual representations of hyperlinks to indicate to the user which hyperlinks the user may follow. For example, if a web page includes the text, "Click here for more information," the word "here" may be underlined to indicate to the user that selecting (e.g., clicking on) the word "here" will cause the web browser to navigate via a hyperlink to another web page (referred to as the "anchor" of the hyperlink).

Textual hyperlinks have proven to be extremely useful and powerful tools. In fact, in the first incarnation of the World Wide Web, web pages could only contain text. In such web pages, all hyperlinks were visually represented using text displayed with a special characteristic (e.g., underlining or a special color) indicating that the text represented a hyperlink. Textual representations of hyperlinks have the benefit, for example, of allowing hyperlinks to be visually embedded within otherwise normal prose text, such as news articles and email messages, without visually interrupting the flow of such text.

Textual representations of hyperlinks, however, have certain drawbacks. For example, the textual representation of a hyperlink may not make the destination (anchor) of the hyperlink clear to the user. In the case of the text "Click here for more information," where the word "here" represents a hyperlink, the text does not convey the destination of the hyperlink to the user. Instead, the user only knows that clicking on the word "here" will cause the web browser to leave the current web page and navigate to another one. To identify the destination of the web page, the user may be required to navigate to that web page (by selecting the hyperlinked text) and view it, or to perform a cumbersome operation such as cutting and pasting the URL of the hyperlink into a document. In either case, it is tedious and time-consuming for the user to identify the destination of the hyperlink and therefore to decide whether to navigate to that destination.

Some have attempted to address these problems with textual representations of hyperlinks by using graphical representations of hyperlinks. For example, a picture of a person on a web page may represent a hyperlink to that person's home page. Clicking on the picture will cause the web browser to navigate to the hyperlinked home page. Graphical hyperlinks have the benefit, in comparison to purely textual hyperlinks, of providing the user with a clearer indication of the hyperlink's destination. On the other hand, graphic images must typically occupy a significant area on the web page (so-called visual "real estate") before they can provide enough visual information to be useful to the user as an indication of the hyperlink's destination. Graphical hyperlinks, therefore, are of limited value in web pages and other situations in which visual real estate is at a premium and must be used as efficiently as possible.

What is needed, therefore, are improved techniques for providing visual representations of hyperlinks.

SUMMARY

A computer program provides a first set of representations (e.g., textual representations) of a first set of hyperlinks. In response to selection by a user of one of the first set of hyperlink representations (such as by clicking on or hovering a cursor over the representation), the program displays a second set of representations (e.g., graphical representations) of a second set of hyperlinks. The user may select one of the second set of representations, in response to which the program navigates to the destination of the hyperlink. The second set of representations may, for example, be logos of companies, and the second set of hyperlinks may be hyperlinks to the companies' web sites.

DETAILED DESCRIPTION

A computer program provides a first set of representations (e.g., textual representations) of a first set of hyperlinks. In response to selection by a user of one of the first set of hyperlink representations (such as by clicking on or hovering a cursor over the representation), the program displays a second set of representations (e.g., graphical representations) of a second set of hyperlinks. The user may select one of the second set of representations, in response to which the program navigates to the destination of the hyperlink. The second set of representations may, for example, be logos of companies, and the second set of hyperlinks may be hyperlinks to the companies' web sites.

Figure 1A:
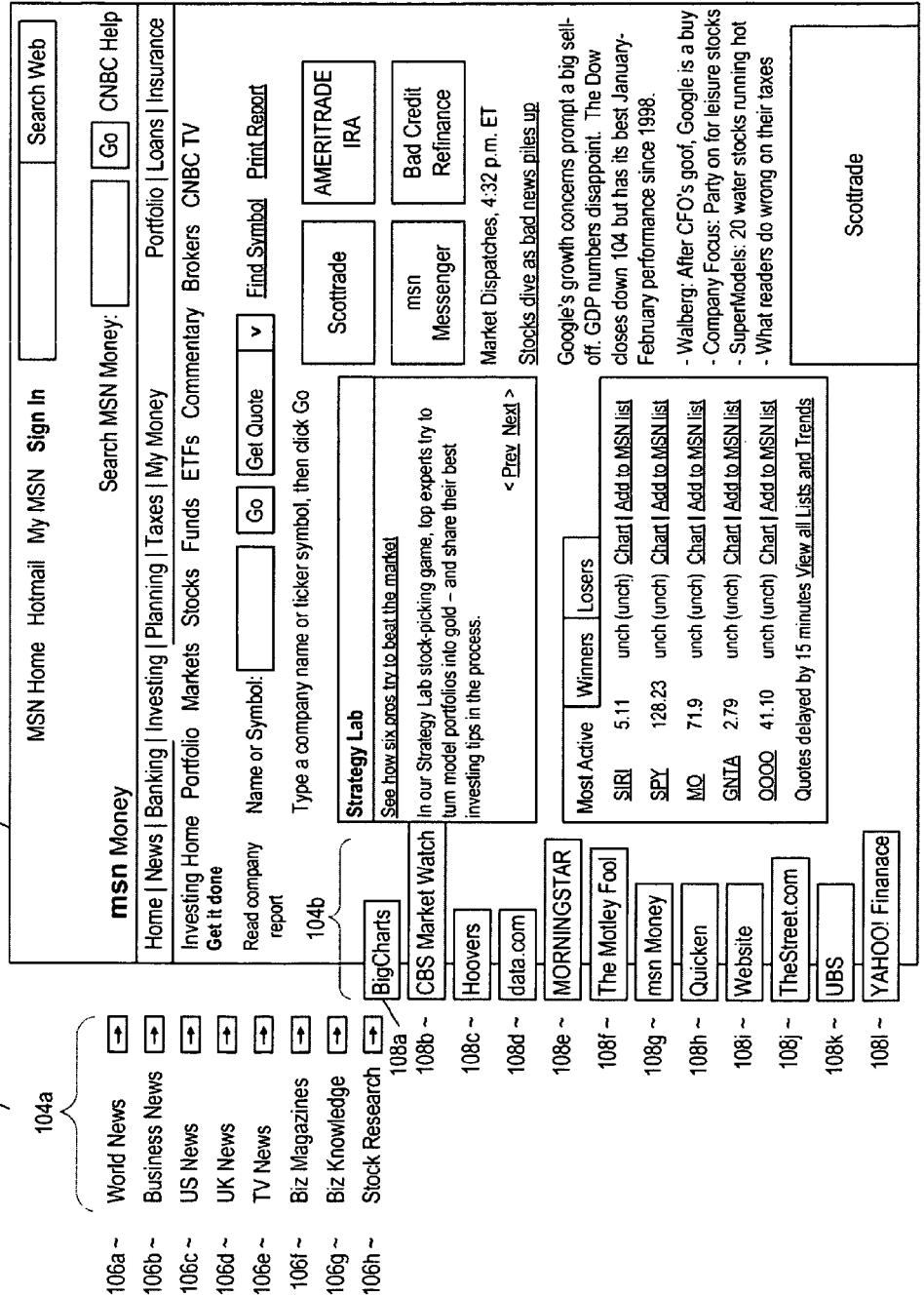
FIGS. 1A-1B are illustrations of web page hyperlinks displayed by embodiments of the present invention.

For example, referring to FIG. 1A, a web page 100 is shown according to one embodiment of the present invention. The web page 100 includes a first frame 102*a* displaying a first set of textual hyperlink representations 104*a*, and a second frame 102*b* displaying the contents of another web page.

In the embodiment illustrated in FIG. 1A, the first set of hyperlink representations 104*a* includes hypertext 106*a-h*. In this example, the hypertext 106*a-h* includes text representing categories of news web sites. For example, hypertext 106*a* ("World News") represents the category of world news web sites, hypertext 106*b* ("Business News") represents the category of business news web sites, and so on. The particular number, selection, and categorization of hypertext 106*a-h* shown in FIG. 1A is provided merely as an example and does not constitute a limitation of the present invention.

The hyperlink representations 104*a* enable the user to access the underlying hyperlinks to external websites by hovering over selecting any of the hypertext 106*a-h*. The user may, for example, select a particular link either by clicking on one of the hypertext links 106*a-h* or by hovering a mouse cursor over one of the hypertext links 106*a-h*.

In response to receiving a selection of one of the hypertext links 106*0a-h* from the user, the web page 100 displays a second set of hyperlink representations 104*b*. In the particular example illustrated in FIG. 1A, the user has clicked on or hovered the mouse cursor over hypertext 106*h* ("Stock Research"). In response, the web page 100 has displayed the second set of hyperlink representations 104b, which represent hyperlinks within the selected category. In other words, each of the hyperlink representations 108a-1 represents a hyperlink to a stock research web site.

More specifically, in the embodiment illustrated in FIG. 1A, each of the hyperlink representations 108a-1 is a graphic image of the logo of the web site that is the destination of the hyperlink. For example, hyperlink representation 108a is the logo of www.bigcharts.com, and the hyperlink representation 108a acts as a link to www.bigcharts.com.

Therefore, when the user selects (e.g., clicks on or hovers over) one of the second set of hyperlink representations 108a-1, the web browser displays the destination of the selected hyperlink in the frame 102b. For example, if the user selects hyperlink representation 108a (i.e., the logo of www.bigcharts.com), the web browser will navigate to and display the home page of www.bigcharts.com in frame 102b.

Figure 1B:
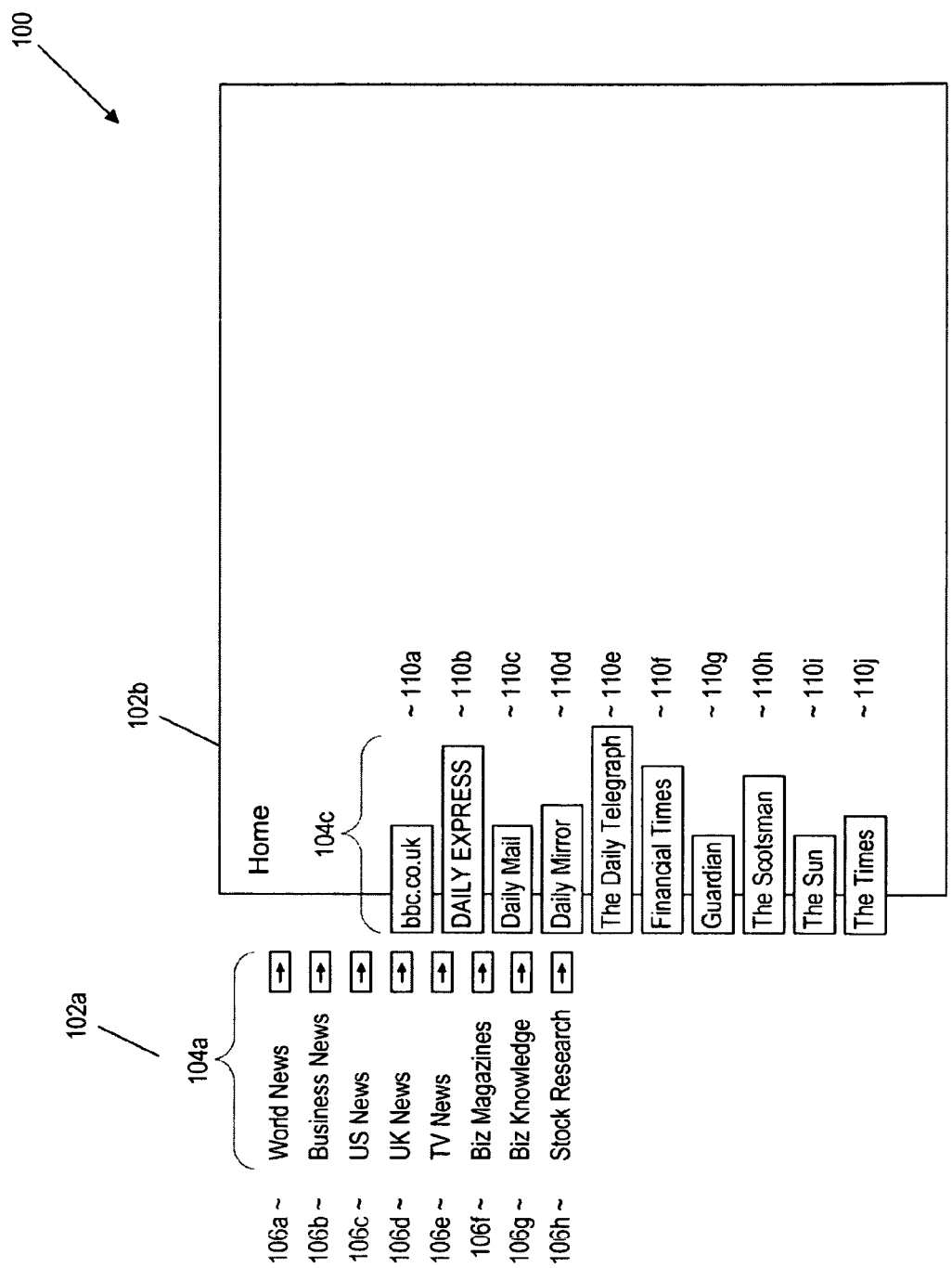

Different sets of hyperlinks are displayed as the user selects (e.g., clicks on or hovers over) different ones of the first set of hyperlinks 106a-h. For example, as shown in FIG. 1B, when the user selects hyperlink 106d ("UK News"), the web page 100 displays a set 104c of hyperlink representations 110a-j depicting logos of UK news web sites. If hovering is enabled to activate the first set 104a of links 106a-j, the user may quickly view the links in different categories by moving the mouse cursor over different ones of the first set 104a of links 106a-h. In a web browser, such a feature may be enabled using AJAX technology, through which all of the logos may be pre-downloaded with the web page 100, and then quickly displayed to the user without requiring additional accesses to the server.

The techniques just described may, for example, be implemented in conjunction with a message board aggregation web site of the kind disclosed in the patent application entitled, "Message Board Aggregator."

One advantage of the techniques disclosed herein is that hyperlink representations (e.g., the hyperlinks 104b and 104c) may be displayed to the user essentially instantaneously. Such techniques, therefore, provide the user with a method of scanning through links that is more intuitive and thus quicker for users than traditional techniques. Furthermore, the use of company logos or other graphical representations of hyperlinks facilitates the users experience, because it is likely that the user will already associate the company logo with the corresponding company name (attached to the hyperlink). The method is also visually more appealing than commonly used plain text methods.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, the functions performed by the aggregation server 112 shown in FIG. 1 may be further subdivided into additional components for performing the same functions.

The first set of hyperlinks 104a may be sorted into categories, sub-categories, and so on, in any manner. Alternatively, they may be unsorted. The hyperlinks that are displayed may be predetermined by the web page designer, determined by the user, or any combination thereof. The user may, for example, be provided with the ability to set up categories (and subcategories) comprising favorite website hyperlinks.

Any kind of computer program may implement the techniques disclosed herein. For example, the techniques disclosed herein may be implemented in a web site displayed by a web browser.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer program product stored on a non-transitory computer-readable medium, comprising:
   computer code for causing display of a first set of representations of a first set of hyperlinks in connection with a page that includes a second set of representations of a second set of hyperlinks that are pre-downloaded with the page;
   computer code for allowing receipt of a first input from a user indicating a selection of one of the first set of hyperlink representations;
   computer code for causing, in response to the receiving the first input, display of the second set of representations of the second set of hyperlinks that are pre-downloaded with the page such that the second set of representations of the second set of hyperlinks are displayed in a same window as at least one of the first set of representations of the first set of hyperlinks without requiring an additional access to a server;

computer code for allowing receipt of a second input from the user indicating a selection of one of the second set of hyperlink representations; and computer code for causing, in response to the receiving the second input, navigation to a destination specified by the selected one of the second set of hyperlink representations;

wherein at least one of the first set of hyperlinks or at least one of the second set of hyperlinks is stock-related;

wherein at least a portion of the page is implemented utilizing AJAX technology.

2. The computer program product of claim 1, wherein the computer code is operable such that the first input from the user includes a mouse click indicating the selection of one of the first set of hyperlink representations.

3. The computer program product of claim 1, wherein the computer code is operable such that the first input from the user indicating the selection of one of the first set of hyperlink representations includes a mouse cursor hovering over the selected one of the first set of hyperlink representations.

4. The computer program product of claim 1, wherein the computer code is operable such that the first set of representations of the first set of hyperlinks is a set of textual representations.

5. The computer program product of claim 1, wherein the computer code is operable such that the first set of representations of the first set of hyperlinks is a set of graphical representations.

6. The computer program product of claim 1, wherein the computer code is operable such that the second set of representations is a set of graphical representations.

7. The computer program product of claim 1, wherein the computer code is operable such that the second input from the user includes a mouse click indicating the selection of one of the second set of hyperlink representations.

8. The computer program product of claim 1, wherein the computer code is operable such that the second input from the user includes a mouse cursor hovering over the selected one of the second set of hyperlink representations.

9. The computer program product of claim 1, wherein the computer code is operable such that the display of the second set of representations of the second set of hyperlinks is substantially immediately after the receipt of the first input.

10. The computer program product of claim 1, wherein the computer code is operable such that the first set of representations of the first set of hyperlinks is specified by the user before the display of the first set of representations.

11. The computer program product of claim 1, wherein the computer code is operable such that the first set of representations of the first set of hyperlinks is sorted into categories.

12. The computer program product of claim 1, wherein the computer code is operable such that the second set of representations of the second set of hyperlinks is specified by the user before the display of the second set of representations.

13. The computer program product of claim 1, wherein the computer code is operable such that the second set of representations of the second set of hyperlinks is sorted into categories.

14. A system that includes a processor with memory and is capable of executing logic functions, comprising:

logic for causing display of a first set of representations of a first set of hyperlinks in connection with a page that includes a second set of representations of a second set of hyperlinks that are pre-downloaded with the page;

logic for allowing receipt of a first input from a user indicating a selection of one of the first set of hyperlink representations;

logic for causing, in response to the receiving the first input, display of the second set of representations of the second set of hyperlinks that are pre-downloaded with the page such that the second set of representations of the second set of hyperlinks are displayed in a same window as at least one of the first set of representations of the first set of hyperlinks without requiring an additional access to a server;

logic for allowing receipt of a second input from the user indicating a selection of one of the second set of hyperlink representations; and logic for causing, in response to the receiving the second input, navigation to a destination specified by the selected one of the second set of hyperlink representations;

wherein at least one of the first set of hyperlinks or at least one of the second set of hyperlinks is stock-related;

wherein at least a portion of the page is implemented utilizing AJAX technology.

15. The system of claim 14, wherein the system is operable such that the first set of representations of the first set of hyperlinks is specified by the user before the display of the first set of representations.

16. The system of claim 14, wherein the system is operable such that the first set of representations of the first set of hyperlinks is sorted into categories.

17. The system of claim 14, wherein the system is operable such that the second set of representations of the second set of hyperlinks is specified by the user before the display of the second set of representations.

18. A computer-implemented method, comprising:

causing display of a first set of representations of a first set of hyperlinks in connection with a page that includes a second set of representations of a second set of hyperlinks that are pre-downloaded with the page;

allowing receipt of a first input from a user indicating a selection of one of the first set of hyperlink representations;

causing, in response to the receiving the first input, display of the second set of representations of the second set of hyperlinks that are pre-downloaded with the page such that the second set of representations of the second set of hyperlinks are displayed in a same window as at least one of the first set of representations of the first set of hyperlinks without requiring an additional access to a server;

allowing receipt of a second input from the user indicating a selection of one of the second set of hyperlink representations; and causing, in response to the receiving the second input, navigation to a destination specified by the selected one of the second set of hyperlink representations;

wherein at least one of the first set of hyperlinks or at least one of the second set of hyperlinks is stock-related;

wherein at least a portion of the page is implemented utilizing AJAX technology.

19. The computer-implemented method of claim 18, wherein the first set of representations of the first set of hyperlinks is specified by the user before the display of the first set of representations.

20. The computer-implemented method of claim 18, wherein the second set of representations of the second set of hyperlinks is specified by the user before the display of the second set of representations.

* * * * *